(12) United States Patent
Carrier

(10) Patent No.: US 7,258,348 B2
(45) Date of Patent: Aug. 21, 2007

(54) MACHINING FIXTURE FOR CENTERING AND HOLDING WORKPIECE

(75) Inventor: Charles William Carrier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 11/013,623

(22) Filed: Dec. 16, 2004

(65) Prior Publication Data

US 2006/0131821 A1 Jun. 22, 2006

(51) Int. Cl.
B23B 31/20 (2006.01)

(52) U.S. Cl. .................. 279/4.07; 279/4.09; 279/4.12; 279/50; 279/137; 269/254 CS

(58) Field of Classification Search .............. 279/4.07, 279/4.09, 4.12, 50, 137, 43.1, 43.4, 46.2, 279/43.5, 46.5, 136, 141; 269/254 CS
See application file for complete search history.

(56) References Cited

U.S. PATENT DOCUMENTS

| | | | | |
|---|---|---|---|---|
| 1,470,158 A * | 10/1923 | Garrison | ..................... | 279/136 |
| 1,561,843 A * | 11/1925 | Garrison | ..................... | 279/136 |
| 2,695,787 A * | 11/1954 | Sunnen | ...................... | 279/46.5 |
| 2,982,557 A * | 5/1961 | Anschutz | ..................... | 279/57 |
| 3,701,537 A * | 10/1972 | Rossman et al. | .......... | 279/2.01 |
| 3,941,363 A * | 3/1976 | Ogg | .............. | 269/100 |
| 4,106,745 A * | 8/1978 | Carrow | ......................... | 249/97 |
| 4,196,897 A | 4/1980 | Gordon | | |
| 4,380,939 A | 4/1983 | Gardner | | |
| 4,432,559 A * | 2/1984 | Rasmussen | ................ | 279/4.07 |
| 4,564,995 A | 1/1986 | Kase | | |
| 4,599,769 A | 7/1986 | Latzko et al. | | |
| 4,709,847 A * | 12/1987 | Koller | ........................ | 228/49.1 |
| 4,730,819 A * | 3/1988 | Hirschhorn et al. | ........ | 269/221 |
| 5,025,690 A | 6/1991 | Myers | | |
| 5,347,866 A | 9/1994 | Maurer | | |
| 5,429,376 A * | 7/1995 | Mueller et al. | ............ | 279/4.07 |
| 5,613,692 A * | 3/1997 | Lloyd | ........................ | 279/2.03 |
| 5,680,801 A | 10/1997 | Keller | | |
| 5,997,010 A * | 12/1999 | Lloyd | ........................ | 279/2.03 |
| 6,224,067 B1 * | 5/2001 | Lindstrom | ................. | 279/4.09 |
| RE37,397 E * | 10/2001 | Lloyd | ........................ | 279/2.03 |
| 6,352,496 B1 | 3/2002 | Oldani | | |
| 6,497,417 B2 * | 12/2002 | Wu | ........................... | 279/4.08 |
| 6,575,030 B1 | 6/2003 | Lauf et al. | | |
| 6,771,090 B2 | 8/2004 | Harris et al. | | |
| 6,782,779 B2 | 8/2004 | Steagall et al. | | |
| 2006/0091618 A1 * | 5/2006 | Rosberg | .................... | 279/4.01 |

* cited by examiner

*Primary Examiner*—Monica Carter
*Assistant Examiner*—Michael W. Talbot
(74) *Attorney, Agent, or Firm*—William Scott Andes; Steven J. Rosen

(57) ABSTRACT

A centering and holding fixture includes a base, a piston disposed within a piston chamber at least partially located within the base, and a radially flexible ring connected to the piston by force transmission apparatus operable to contract and expand the radially flexible ring by upward and downward motions respectively of the piston. The flexible ring may be slotted and may include alternating inwardly and outwardly extending radial slots extending axially through the flexible ring and extending radially inwardly and radially outwardly from radially outer and inner surfaces of the flexible ring respectively to axial stress relief holes extending axially through the flexible ring. The apparatus may further be operable to contract the radially flexible ring when the piston chamber is pressurized and to expand it when the piston chamber is depressurized. Spring loaded clamps mounted to the base may be used to secure a workpiece to the holding fixture.

32 Claims, 2 Drawing Sheets

MACHINING FIXTURE FOR CENTERING AND HOLDING WORKPIECE

FIELD OF THE INVENTION

This invention relates generally to multi axis machine tools such as vertical turret lathes (VTL's) with rotary tables and, more particularly, to fixtures and chucks used to position and hold workpieces on the rotary table.

BACKGROUND OF THE INVENTION

In most machining operations involving turning a workpiece, it is necessary to securely fix the workpiece in place upon a rotary table or other rotary work surface. Examples of such surfaces to which workpieces are secured include rotary tables, mill tables, fixtures or face plates and lathes, etc. Usually, the workpiece must be secured upon the surface to expose a selected portion of the workpiece upon which work such as cutting or machining is to be performed. In addition to securely fixing the workpiece in place, it is often necessary or desirable to provide fine adjustment in the position and alignment of the workpiece. For example, when a workpiece is secured to a rotary table, accurate alignment of a selected portion of the workpiece with the axial center of the rotary table is desired to facilitate and accurately conduct machine operations upon the workpiece.

Prior to any machining operations, it is necessary to align the part to be machined with the center of rotation of the machine tool. This is particularly difficult for machining large diameter workpieces, such as turbine rotors, on vertical turret lathes. Typically, such workpieces are held in 3-jaw or 4-jaw chucks which are mounted to rotary tables and aligned to the axis of the rotary table. Because of the critical nature of such workpieces, it may be necessary to align them to small tolerances such as within 0.002" or less. This procedure is very time consuming and, therefore, very costly.

SUMMARY OF THE INVENTION

A centering and holding fixture includes a base, a piston disposed within a piston chamber that is at least partially located within the base. A radially flexible ring is connected to the piston by a force transmission apparatus operable to contract and expand the radially flexible ring by upward and downward motions respectively of the piston. The flexible ring may be slotted and may include alternating inwardly and outwardly extending radial slots extending axially through the flexible ring and extending radially inwardly and radially outwardly from radially outer and inner surfaces of the flexible ring respectively to axial stress relief holes extending axially through the flexible ring. The apparatus may further be operable to contract the radially flexible ring when the piston chamber is pressurized and to expand it when the piston chamber is depressurized. Spring loaded clamps mounted to the base may be used to secure an annular workpiece to the holding fixture.

The flexible ring may be slotted and an exemplary embodiment of the flexible ring has alternating inwardly and outwardly extending radial slots extending axially through the flexible ring and extending radially inwardly and radially outwardly from radially outer and inner surfaces of the flexible ring, respectively, to axial stress relief holes extending axially through the flexible ring.

An exemplary embodiment of the force transmission apparatus includes an annular sleeve having a central bore coaxial with an upper counterbore in the annular sleeve. The central bore is wider than the upper counterbore and the central bore is separated from the upper counterbore by an upper annular ledge. A plurality of piston springs are circularly disposed within the upper counterbore in compression between the upper annular ledge and the piston. A piston extension rests on the piston and has a cylindrical extension shaft at least partially disposed within the bore and a downwardly tapering radially outer conical edge on the extension shaft. The radially flexible ring rests on a top of the annular sleeve and is disposed around the piston extension and at least a portion of the flexible ring has an upwardly tapering shape substantially conforming to the radially outer conical edge of the piston extension.

One more particular exemplary embodiment of the centering and holding fixture further includes an upper annular sleeve wall extending upwardly from the top of the annular sleeve. An extension head attached to the extension shaft radially overlaps the upper annular sleeve wall and has a downwardly tapering radially outer conical edge. The radially flexible ring resting on the top of the annular sleeve is disposed around the extension head. An annular lower portion of the flexible ring abuts and conforms to the upper annular sleeve wall and an upwardly tapering conical annular upper portion of the flexible ring substantially conforms to the radially outer conical edge of the extension head.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
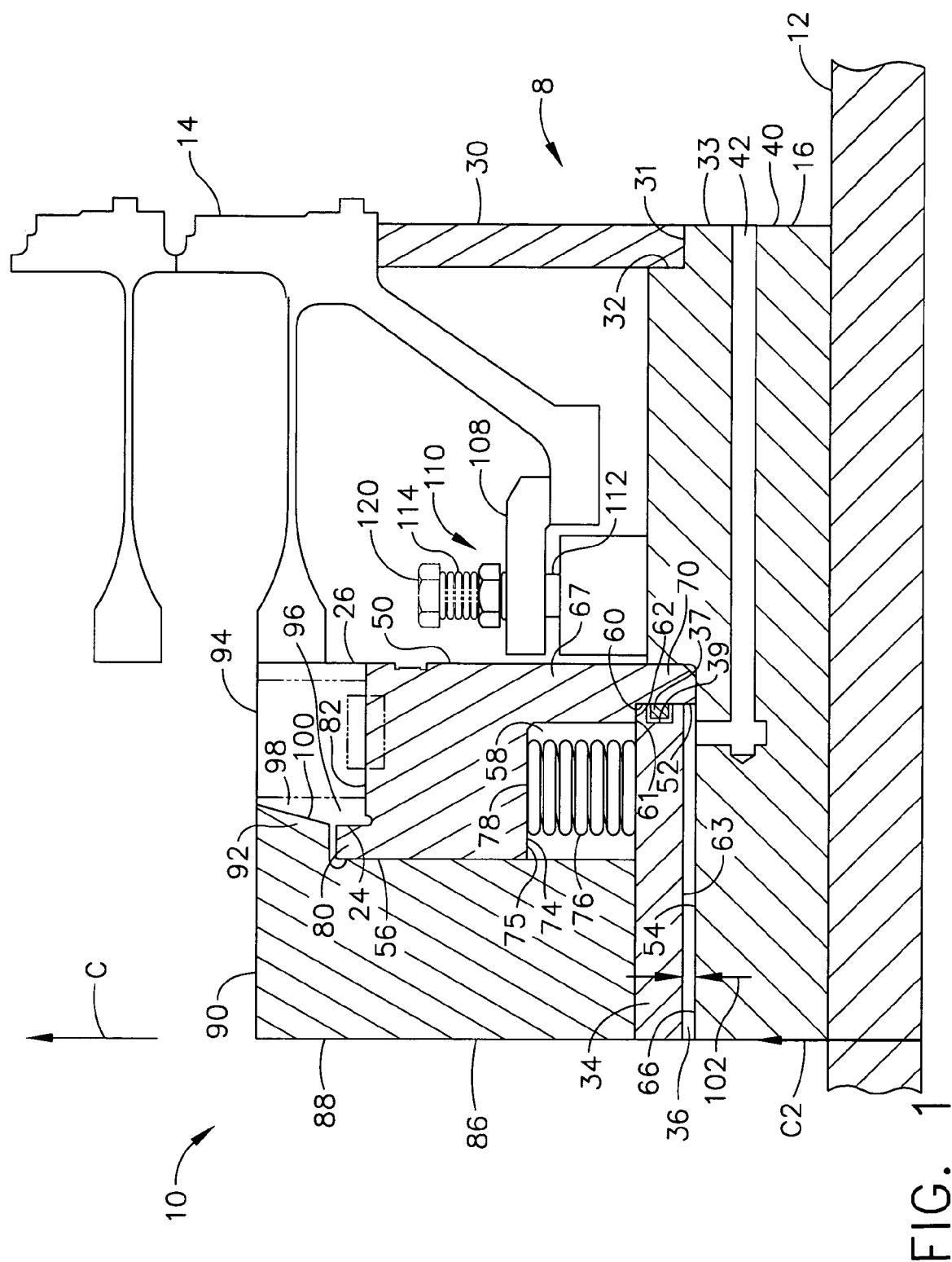
FIG. 1 is a schematical cross-sectional view illustration of a fixture to center a workpiece with respect to a rotational axis of a rotary table and hold and secure the workpiece to the rotary table.

Illustrated in FIG. 1 is a fixtured machining assembly 8 including an annular workpiece 14 mounted in a centering and holding fixture 10 fixedly attached to a horizontal rotary table 12 designed for rotation about a vertical axis C2 of a machine tool such as a vertical lathe (not illustrated). The fixture 10 is designed to releasably center and carry an annular workpiece 14 having a center axis C. The fixture 10 is designed for aligning the center axis C of the workpiece 14 with the vertical axis C2 of the rotary table 12. The fixture 10 includes a cylindrical base 16 relatively fixedly mounted to the rotary table 12.

The fixture 10 includes a radially outer support ring 30 which vertically supports the annular workpiece 14 and rests within a radially outer groove 31 illustrated herein as an outer annular rabbet 32 along a radially outer edge 33 in the base 16. An exemplary cylindrical piston 34 is disposed within an exemplary cylindrical piston chamber 36. A pressurized fluid supply passage 42 extends from an outer periphery 40 of the base 16 to the piston chamber 36. A fitting may be used for connecting a pressurized fluid hose to the supply passage 42. The fixture may use pressurized hydraulic fluid or pressurized air. An annular sleeve 50 fixedly attached to the base 16 rests in a radially inner annular rabbet 52 formed in a central cylindrical recess 54 in the base 16, the inner annular rabbet 52 being located radially inwardly of the radially outer annular rabbet 32.

The annular sleeve 50 has a central bore 56 and upper and lower counterbores 58 and 60, respectively, separated by a lower annular ledge 61. The lower counterbore 60 is upwardly bounded by a downwardly facing annular lower surface 62 of the lower annular ledge 61 in a lower portion 67 of the annular sleeve 50. The upper counterbore 58 is wider than the lower counterbore 60. The piston chamber 36 is bounded upwardly by a downwardly facing piston surface 63 of the piston 34 and downwardly by an upwardly facing inner circular surface 66 of the base 16 located within the recess 54, respectively.

The piston chamber 36 is bounded radially by a lower counterbore wall 70 that circumscribes the lower counterbore 60 in the annular sleeve 50. An annular gap 102 lies between the piston 34 and the lower counterbore wall 70. A piston ring 37 is disposed in a piston ring groove 39 in the piston 34 to seal against the lower counterbore wall 70. The upper counterbore 58 is upwardly bounded by an upper annular surface 74 on an upper annular ledge 75 separating the upper counterbore 58 and bore 56. A plurality of piston springs 76 are circularly disposed within the upper counterbore 58 in compression. The piston springs 76 are loosely mounted on piston spring pins 78 which are relatively fixed with respect to the piston springs 76 and illustrated as attached to the piston 34.

An upper annular sleeve wall 80 extends axially upwardly from a top 82 of the annular sleeve 50 and is radially inwardly bounded by the bore 56. A piston extension 86 includes a cylindrical extension shaft 88 disposed within the bore 56 and resting on the piston 34. An extension head 90 attached to the extension shaft 88 radially overlaps the upper annular sleeve wall 80. A radially outer conical edge 92 of the extension head 90 tapers downwardly. A radially flexible ring 94 rests on the top 82 of the annular sleeve 50 and is disposed around the extension head 90 attached to the extension shaft 88 and the upper annular sleeve wall 80 of the annular sleeve 50.

Figure 2:
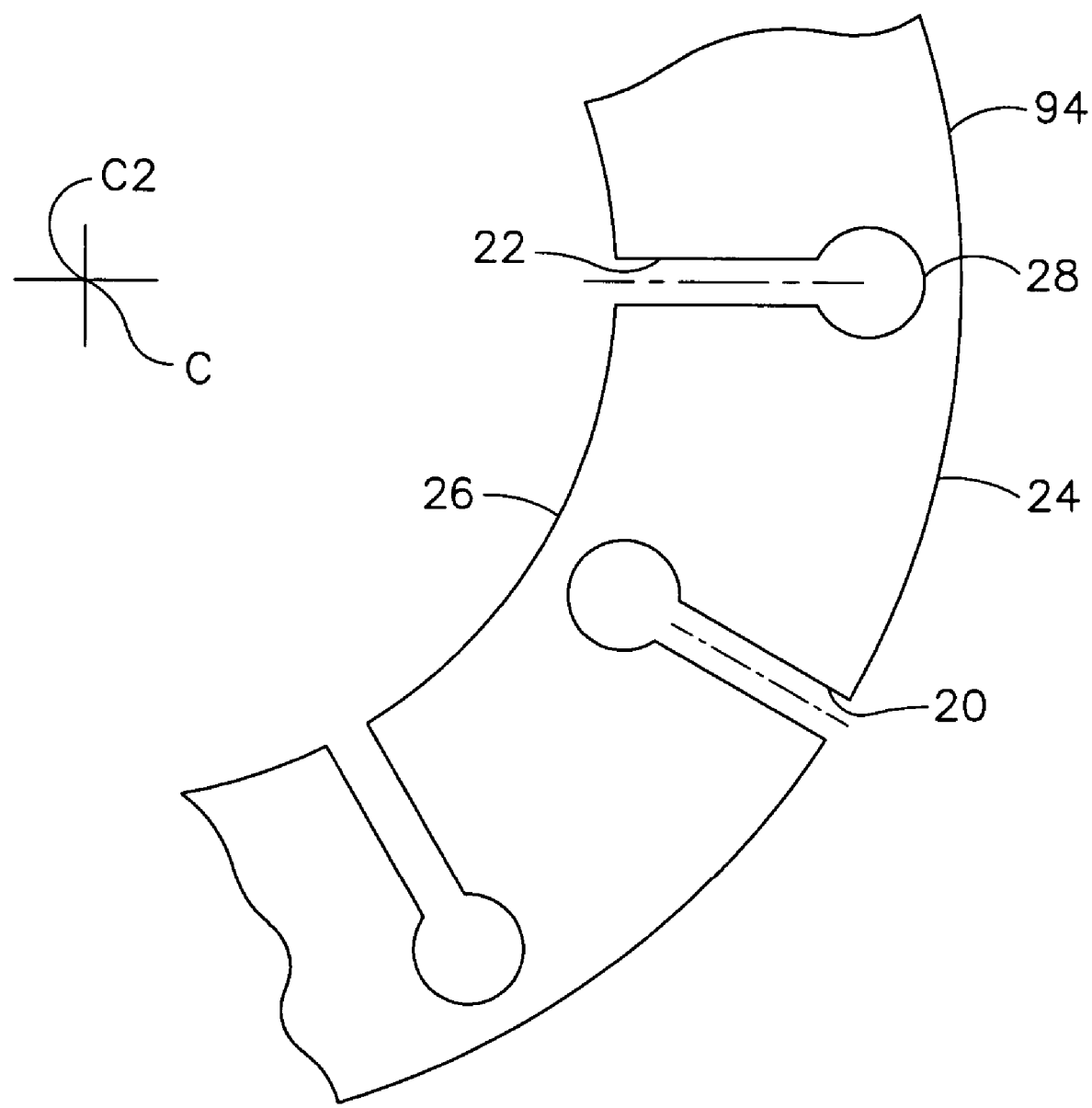
FIG. 2 is a top view illustration of a portion of flexible holding ring of the fixture illustrated in FIG. 1.

The flexible ring 94 includes an annular lower portion 96 that abuts and conforms to the shape of the upper annular sleeve wall 80. The flexible ring 94 includes a conical annular upper portion 98 that tapers upwardly and abuts and substantially conforms to the tapered shape of the radially outer conical edge 92 of the extension head 90. FIG. 2 illustrates an exemplary embodiment of the flexible ring 94 that is slotted so that it is flexible in the radial direction. The flexible ring 94 includes alternating inwardly and outwardly extending radial slots 20 and 22 extending radially inwardly and radially outwardly from a radially outer and inner surfaces 24 and 26, respectively, to axial stress relief holes 28. The inwardly and outwardly extending radial slots 20 and 22 and the stress relief holes 28 extend axially through the flexible ring 94. Thus, fixture 10 provides a force transmission means for causing the radially flexible ring 94 to contract and expand by upward and downward motions respectively of the piston 34 illustrated in FIG. 1.

Referring to FIG. 1, the flexible ring 94 is pre-loaded along a conical surface 100 between the conical annular upper portion 98 of the flexible ring 94 and the radially outer conical edge 92 of the extension head 90. The tapered conical annular upper portion 98 of the flexible ring 94 is pre-loaded against the radially outer conical edge 92 of the extension head 90 such that when there is no pressure supplied to the piston chamber 36 or the piston chamber 36 is depressurized, the flexible ring 94 is radially expanded and centers and holds annular workpiece 14 in place for machining. When there is no pressure supplied to the piston chamber 36, the piston 34 is urged downwardly by the piston springs 76 which are compressively loaded between the annular sleeve 50 and the piston 34. The sleeve is fixedly attached to the base 16 of the fixture 10, thus, the piston springs 76 urge the tapered conical annular upper portion 98 of the flexible ring 94 against the radially outer conical edge 92 of the extension head 90 which radially expands the flexible ring 94.

The flexible ring 94 contracts when pressure is supplied to the piston chamber 36. The piston 34 moves upwardly working against a compressive force of the piston springs 76 when pressure is supplied to the piston chamber 36 causing the piston extension 86 to move upwardly. This causes the radially outer conical edge 92 of the extension head 90 to move away from the conical annular upper portion 98 of the flexible ring 94 allowing the flexible ring 94 to radially contract such that the annular workpiece 14 may be mounted in the fixture 10 attached to the rotary table 12. Thus, fixture 10 provides the force transmission means with the ability for causing the radially flexible ring 94 to contract when the piston chamber 36 is pressurized and to expand when the piston chamber 36 is depressurized.

Spring loaded clamps 110 have lugs 108 pivotably mounted on threaded pins 112 extending upwardly from the base 16. Clamp springs 114 are disposed in compression between the lugs 108 and clamp nuts 120 that are screwed on to the threaded pins 112. Once the workpiece 14 is positioned in place, the lugs 108 are pivoted to engage the workpiece and hold the workpiece in place. When the pressure to the piston chamber 36 is removed, the spring loaded lugs 108 hold the workpiece 14 in place.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A centering and holding fixture comprising:
a base,
a piston disposed within a piston chamber at least partially located within the base,
a radially flexible ring connected to the piston by a force transmission means for causing the radially flexible ring to contract and expand by upward and downward motions respectively of the piston,
the force transmission means being effective for causing the radially flexible ring to contract when the piston chamber is pressurized and to expand when the piston chamber is depressurized, and
spring loaded clamps having lugs pivotably mounted on threaded pins extending upwardly from the base and clamp springs disposed in compression between the lugs and clamp nuts screwed on to the threaded pins.

2. A fixture as claimed in claim 1 further comprising alternating inwardly and outwardly extending radial slots extending axially through the flexible ring and extending radially inwardly and radially outwardly from radially outer and inner surfaces of the flexible ring respectively to axial stress relief holes extending axially through the flexible ring.

3. A fixture as claimed in claim 2 further comprising a pressurized fluid supply passage extending radially from an outer periphery of the base to the piston chamber.

4. A centering and holding fixture comprising:
a base,
a piston disposed within a piston chamber at least partially located within the base, and
a radially flexible ring connected to the piston by a force transmission means for causing the radially flexible ring to contract and expand by upward and downward motions respectively of the piston,
the force transmission means including an annular sleeve fixedly connected to the base and having a central bore coaxial with an upper counterbore in the annular sleeve,
the central bore being wider than the upper counterbore and the central bore being separated from the upper counterbore by an upper annular ledge,
a plurality of piston springs circularly disposed within the upper counterbore in compression between the upper annular ledge and the piston,
a piston extension resting on the piston and having a cylindrical extension shaft at least partially disposed within the bore,
a downwardly tapering radially outer conical edge on the extension shaft,
a radially flexible ring resting on a top of the annular sleeve disposed around the piston extension, and
at least a portion of the flexible ring having an upwardly tapering shape substantially conforming to the radially outer conical edge of the piston extension.

5. A fixture as claimed in claim 4 further comprising the flexible ring being slotted.

6. A fixture as claimed in claim 5 further comprising alternating inwardly and outwardly extending radial slots extending axially through the flexible ring and extending radially inwardly and radially outwardly from radially outer and inner surfaces of the flexible ring respectively to axial stress relief holes extending axially through the flexible ring.

7. A fixture as claimed in claim 4 further comprising spring loaded clamps having lugs pivotably mounted on threaded pins extending upwardly from the base and clamp springs disposed in compression between the lugs and clamp nuts screwed on to the threaded pins.

8. A fixture as claimed in claim 7 further comprising a pressurized fluid supply passage extending radially from an outer periphery of the base to the piston chamber.

9. A centering and holding fixture comprising:
a cylindrical base,
a cylindrical piston disposed within a cylindrical piston chamber bounded downwardly by an upwardly facing inner circular surface of the base located within a central recess in the base,
at least one pressurized fluid supply passage extending radially from an outer periphery of the base to the piston chamber,
an annular sleeve fixedly connected to the base and having a central bore coaxial with upper and lower counterbores in the annular sleeve,
the central bore being wider than the upper counterbore and separated from the upper counterbore by an upper annular ledge,
the upper counterbore being wider than the lower counterbore and separated from the lower counterbore by a lower annular ledge,
the lower counterbore upwardly bounded by a downwardly facing annular lower surface of the lower annular ledge in a lower portion of the annular sleeve,
the piston chamber being upwardly bounded by a downwardly facing piston surface of the piston and downwardly bounded by an upwardly facing inner circular surface of the base located within the recess and radially bounded by a lower counterbore wall that circumscribes the lower counterbore in the annular sleeve,
the upper counterbore being upwardly bounded by an upper annular surface on the upper annular ledge separating the upper counterbore and bore,
a plurality of piston springs circularly disposed within the upper counterbore in compression between the piston and the annular sleeve,
an upper annular sleeve wall extending upwardly from a top of the annular sleeve,
a piston extension including a cylindrical extension shaft disposed within the bore and resting on the piston,
an extension head attached to the extension shaft and radially overlapping the upper annular sleeve wall,
a downwardly tapering radially outer conical edge of the extension head,
a radially flexible ring resting on the top of the annular sleeve disposed around the extension head,
an annular lower portion of the flexible ring abutting and conforming to the upper annular sleeve wall, and
an upwardly tapering conical annular upper portion of the flexible ring substantially conforming to the radially outer conical edge of the extension head.

10. A fixture as claimed in claim 9 further comprising the flexible ring being slotted.

11. A fixture as claimed in claim 10 further comprising alternating inwardly and outwardly extending radial slots extending axially through the flexible ring and extending radially inwardly and radially outwardly from radially outer and inner surfaces of the flexible ring respectively to axial stress relief holes extending axially through the flexible ring.

12. A fixture as claimed in claim 11 further comprising spring loaded clamps having lugs pivotably mounted on threaded pins extending upwardly from the base and clamp springs disposed in compression between the lugs and clamp nuts screwed on to the threaded pins.

13. A fixture as claimed in claim 12 further comprising a pressurized fluid supply passage extending radially from an outer periphery of the base to the piston chamber.

14. A fixture as claimed in claim 13 further comprising a radially outer support ring disposed within an outer groove in the base.

15. A fixtured machining assembly comprising:
an annular workpiece mounted in a centering and holding fixture having a base,
a piston disposed within a piston chamber at least partially located within the base,
a radially flexible ring connected to the piston by a force transmission means for causing the radially flexible ring to contract and expand by upward and downward motions respectively of the piston and center and hold the annular workpiece in place for machining when the flexible ring is expanded, and
the annular workpiece clamped to the fixture by spring loaded clamps having lugs pivotably mounted on threaded pins extending upwardly from the base and clamp springs disposed in compression between the lugs and clamp nuts screwed on to the threaded pins.

16. A fixtured machining assembly as claimed in claim 15 further comprising the flexible ring being slotted.

17. A fixtured machining assembly as claimed in claim 16 further comprising alternating inwardly and outwardly extending radial slots extending axially through the flexible ring and extending radially inwardly and radially outwardly from radially outer and inner surfaces of the flexible ring respectively to axial stress relief holes extending axially through the flexible ring.

18. A fixtured machining assembly as claimed in claim 17 further comprising the force transmission means being effective for causing the radially flexible ring to contract when the piston chamber is pressurized and to expand when the piston chamber is depressurized.

19. A fixtured machining assembly as claimed in claim 18 further comprising a pressurized fluid supply passage extending radially from an outer periphery of the base to the piston chamber.

20. A fixtured machining assembly comprising:
an annular workpiece mounted in a centering and holding fixture having a base,
a piston disposed within a piston chamber at least partially located within the base,
a radially flexible ring connected to the piston by a force transmission means for causing the radially flexible ring to contract and expand by upward and downward motions respectively of the piston and center and hold the annular workpiece in place for machining when the flexible ring is expanded,
the force transmission means including an annular sleeve fixedly connected to the base and having a central bore coaxial with an upper counterbore in the annular sleeve,
the central bore being wider than the upper counterbore and the central bore being separated from the upper counterbore by an upper annular ledge,
a plurality of piston springs circularly disposed within the upper counterbore in compression between the upper annular ledge and the piston,
a piston extension resting on the piston and having a cylindrical extension shaft at least partially disposed within the bore,
a downwardly tapering radially outer conical edge on the extension shaft,
a radially flexible ring resting on a top of the annular sleeve disposed around the piston extension, and
at least a portion of the flexible ring having an upwardly tapering shape substantially conforming to the radially outer conical edge of the piston extension.

21. A fixtured machining assembly as claimed in claim 20 further comprising the flexible ring being slotted.

22. A fixtured machining assembly as claimed in claim 21 further comprising alternating inwardly and outwardly extending radial slots extending axially through the flexible ring and extending radially inwardly and radially outwardly from radially outer and inner surfaces of the flexible ring respectively to axial stress relief holes extending axially through the flexible ring.

23. A fixtured machining assembly as claimed in claim 22 further comprising the annular workpiece clamped to the fixture by spring loaded clamps having lugs pivotably mounted on threaded pins extending upwardly from the base and clamp springs disposed in compression between the lugs and clamp nuts screwed on to the threaded pins.

24. A fixtured machining assembly comprising:
an annular workpiece mounted in a centering and holding fixture having a cylindrical base,
a cylindrical piston disposed within a cylindrical piston chamber bounded downwardly by an upwardly facing inner circular surface of the base located within a central recess in the base,
at least one pressurized fluid supply passage extending radially from an outer periphery of the base to the piston chamber,
a central bore and upper and lower counterbores in an annular sleeve fixedly connected to the base,
the central bore being wider than the upper counterbore and separated from the upper counterbore by an upper annular ledge,
the upper counterbore being wider than the lower counterbore and separated from the lower counterbore by a lower annular ledge,
the lower counterbore upwardly bounded by a downwardly facing annular lower surface of the lower annular ledge in a lower portion of the annular sleeve,
the piston chamber being upwardly bounded by a downwardly facing piston surface of the piston and downwardly bounded by an upwardly facing inner circular surface of the base located within the recess and radially bounded by a lower counterbore wall that circumscribes the lower counterbore in the annular sleeve,
the upper counterbore being upwardly bounded by an upper annular surface on the upper annular ledge separating the upper counterbore and bore,
a plurality of piston springs circularly disposed within the upper counterbore in compression between the piston and the annular sleeve,
an upper annular sleeve wall extending upwardly from a top of the annular sleeve,
a piston extension including a cylindrical extension shaft disposed within the bore and resting on the piston,
an extension head attached to the extension shaft and radially overlapping the upper annular sleeve wall,
a downwardly tapering radially outer conical edge of the extension head,
a radially flexible ring resting on the top of the annular sleeve and operably disposed between the extension head and the annular workpiece for causing the radially flexible ring to contract and expand by upward and downward motions respectively of the piston and center and hold the annular workpiece in place for machining when the flexible ring is expanded,
an annular lower portion of the flexible ring abutting and conforming to the upper annular sleeve wall, and
an upwardly tapering conical annular upper portion of the flexible ring substantially conforming to the radially outer conical edge of the extension head.

25. A fixtured machining assembly as claimed in claim 24 further comprising the flexible ring being slotted.

26. A fixtured machining assembly as claimed in claim 25 further comprising alternating inwardly and outwardly extending radial slots extending axially through the flexible ring and extending radially inwardly and radially outwardly from radially outer and inner surfaces of the flexible ring respectively to axial stress relief holes extending axially through the flexible ring.

27. A fixtured machining assembly as claimed in claim 26 further comprising the annular workpiece clamped to the fixture by spring loaded clamps having lugs pivotably mounted on threaded pins extending upwardly from the base and clamp springs disposed in compression between the lugs and clamp nuts screwed on to the threaded pins.

28. A fixtured machining assembly as claimed in claim 24 further comprising an outer support ring vertically supporting the annular workpiece and disposed within a radially outer groove of the base.

29. A fixtured machining assembly as claimed in claim 28 further comprising the outer support ring being as an annular rabbet along a radially outer edge in the base.

30. A fixtured machining assembly as claimed in claim 29 further comprising the flexible ring being slotted.

31. A fixtured machining assembly as claimed in claim 30 further comprising alternating inwardly and outwardly extending radial slots extending axially through the flexible ring and extending radially inwardly and radially outwardly from radially inner and outer surfaces of the flexible ring respectively to axial stress relief holes extending axially through the flexible ring.

32. A fixtured machining assembly as claimed in claim 31 further comprising the annular workpiece clamped to the fixture by spring loaded clamps having lugs pivotably mounted on threaded pins extending upwardly from the base and clamp springs disposed in compression between the lugs and clamp nuts screwed on to the threaded pins.

* * * * *